(12) United States Patent
Gloge

(10) Patent No.: US 8,226,524 B2
(45) Date of Patent: Jul. 24, 2012

(54) METHOD FOR OPERATING A DRIVETRAIN

(75) Inventor: Oliver Gloge, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 645 days.

(21) Appl. No.: 12/424,070

(22) Filed: Apr. 15, 2009

(65) Prior Publication Data

US 2009/0264249 A1 Oct. 22, 2009

(30) Foreign Application Priority Data

Apr. 21, 2008 (DE) .................. 10 2008 001 277

(51) Int. Cl.
*B60K 1/02* (2006.01)
(52) U.S. Cl. ............... 477/3; 180/65.26; 180/65.265
(58) Field of Classification Search .............. 477/3, 4; 180/65.25, 65.26, 65.265, 65.275, 65.285, 180/65.6, 65.7; 903/930, 945
See application file for complete search history.

(56) References Cited

U.S. PATENT DOCUMENTS

| | | | |
|---|---|---|---|
| 6,941,830 B2 * | 9/2005 | Ibamoto et al. ................. 74/339 |
| 2005/0178592 A1 | 8/2005 | Yamamoto et al. | |
| 2007/0213174 A1 * | 9/2007 | Tamai et al. ..................... 477/52 |
| 2007/0254764 A1 * | 11/2007 | Shibata et al. ................. 475/117 |
| 2007/0259755 A1 * | 11/2007 | Tanishima ........................ 477/3 |
| 2008/0139360 A1 | 6/2008 | Hayashi et al. | |
| 2008/0228362 A1 | 9/2008 | Muller et al. | |

FOREIGN PATENT DOCUMENTS

| | | |
|---|---|---|
| DE | 102005031764 | 1/2007 |
| EP | 1539525 | 6/2005 |
| EP | 1574377 | 9/2005 |
| WO | 2004028848 | 4/2004 |
| WO | 2005070717 | 8/2005 |

\* cited by examiner

*Primary Examiner* — Hau Phan
*Assistant Examiner* — Bryan Evans
(74) *Attorney, Agent, or Firm* — Davis & Bujold, P.L.L.C.

(57) ABSTRACT

A method of operating a motor vehicle drivetrain having, along a power flow, an internal combustion engine, a clutch, an electric motor, a transmission and a drive output. The transmission is associated with a main and auxiliary hydraulic pumps, and an internal or an external starting element. When the engine is at rest and the clutch and starting element are both disengaged, to start with the electric motor, with the brake pedal actuated, the auxiliary hydraulic pump is operated at a first power level to supply the transmission with pressure for maintaining a defined gear. Then, upon recognizing a desire to start, the auxiliary hydraulic pump is changed from a first to a second power level to supply pressure to the transmission to produce starting torque and, only after lapse of a time interval, is the speed of the motor increased to produce the desired starting power or torque.

8 Claims, 1 Drawing Sheet

METHOD FOR OPERATING A DRIVETRAIN

This application claims priority from German patent application serial no. 10 2008 001 277.7 filed Apr. 21, 2008.

FIELD OF THE INVENTION

The invention concerns a method for operating a motor vehicle drivetrain comprising at least a transmission and a hybrid drive.

BACKGROUND OF THE INVENTION

The main components of a motor vehicle drivetrain are a drive assembly and a transmission. The transmission converts torques and rotational speeds, thereby transforming the driving force provided by the drive assembly. The present invention concerns a method for operating a drivetrain which comprises a transmission and, as its drive assembly, a hybrid drive with an internal combustion engine and an electric motor.

In a drivetrain with a so-termed parallel hybrid drive, a clutch is interposed between the combustion engine and the electric motor of the hybrid drive, by means of which the combustion engine of the hybrid drive can be disengaged from a drive output of the drivetrain. When such a drivetrain with a parallel hybrid drive is started up, typically the combustion engine is switched off and the clutch interposed between the combustion engine and the electric motor of the hybrid drive is disengaged, so that starting takes place solely by means of the electric motor of the hybrid drive, ideally from a rotational speed of zero, since the electric motor can already provide a high torque at very low speeds. Accordingly, during such a start of the drivetrain from zero speed there is no so-termed idling speed that could be used to drive a main hydraulic pump associated with the transmission. So in order, nevertheless, to be able to provide a hydraulic pressure in the drivetrain required for starting, in addition to the main hydraulic pump an auxiliary hydraulic pump as well is associated with the transmission, with the help of which a hydraulic pressure required for starting can be produced.

SUMMARY OF THE INVENTION

The present invention now concerns a method for operating a drivetrain comprising a transmission and a hybrid drive, with the help of which, and using the auxiliary hydraulic pump, a starting strategy can be implemented which ensures a high level of comfort during starting.

Starting from the above, the present invention addresses the problem of providing a new type of method for operating a drivetrain that comprises a transmission and a hybrid drive.

With regard to a first aspect of the invention this problem is solved by the invention method.

According to this, when the combustion engine is at rest and the clutch interposed between the internal combustion engine and the electric motor, and the start element, are both disengaged, the procedure adopted for starting under electric motor power alone is such that with the brake pedal actuated, the auxiliary hydraulic pump is initially operated at a first power level in such manner that it supplies the transmission with a pressure required for maintaining a defined gear, and subsequently, when a wish to start up is recognized, the auxiliary hydraulic pump is changed from said first power level to a second power level such that, at the second power level, it supplies the transmission with a pressure required to produce starting torque, and only after the lapse of a defined time interval after changing the auxiliary hydraulic pump from the first to the second power level is the speed of the electric motor of the hybrid drive increased in order to provide the desired starting power or the desired starting torque.

With regard to a second aspect of the invention, this problem is solved by the invention method.

According to this, when the combustion engine is at rest and the clutch interposed between the internal combustion engine and the electric motor, and the starter element, are both disengaged, the procedure adopted for starting under electric motor power alone is such that with the brake pedal actuated, the auxiliary hydraulic pump initially remains switched off, and then, when a desire to start is recognized, the auxiliary hydraulic pump is changed to a power level such that it supplies the transmission with a pressure required for engaging a defined gear and for producing a starting torque, and only after the lapse of a defined time interval after changing the auxiliary hydraulic pump to the power level is the speed of the electric motor of the hybrid drive increased to provide the desired starting power or the desired starting torque.

Both aspects of the present invention provide a starting strategy for a drivetrain with at least a hybrid drive and a transmission, by means of which, using the auxiliary hydraulic pump, starting takes places with a high level of comfort.

BRIEF DESCRIPTION OF THE DRAWINGS

Preferred further developments of the invention emerge from the description given below. Example embodiments of the invention, to which it is not limited, are described in more detail with reference to the drawing, which shows.

DETAILED DESCRIPTION OF THE PREFERRED EMBODIMENTS

The present invention concerns a method for operating a drivetrain of a motor vehicle that comprises at least a transmission and a hybrid drive.

Figure 1:
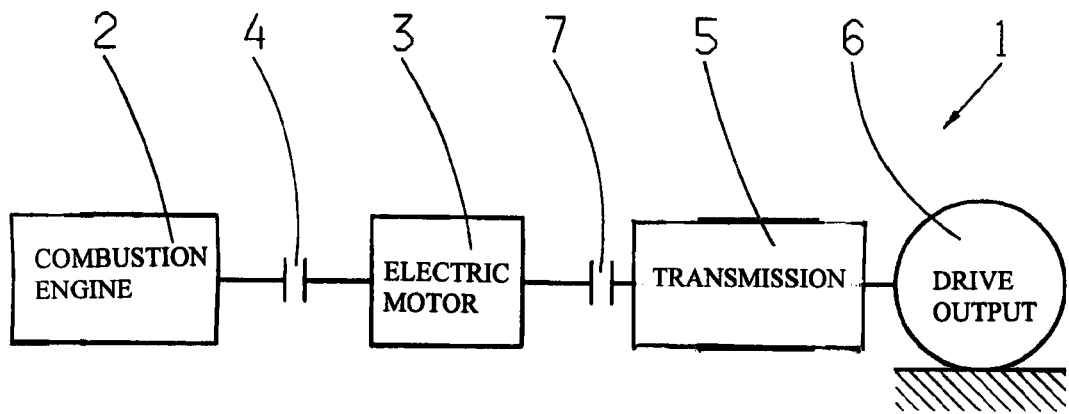
FIG. 1: Layout of a motor vehicle drivetrain with which the method according to the invention can be used.

FIG. 1 shows an example layout of a motor vehicle drivetrain with which the method according to the invention can be used. Thus, FIG. 1 shows the layout of a drivetrain 1 of a motor vehicle, the drivetrain 1 in FIG. 1 comprising a hybrid drive consisting of an internal combustion engine 2 and an electric motor 3. Between the combustion engine 2 and the electric motor 3 is interposed a clutch 4, which is disengaged when the drivetrain 1 is operated exclusively by the electric motor 3. Besides the hybrid drive, the drivetrain 1 in FIG. 1 also comprises a transmission 5, which transmits the driving force produced by the hybrid drive to a drive output 6 of the drivetrain, namely to driven wheels. The transmission can be made for example as an automatic, or an automated transmission. With an automatic transmission, shifts are carried out without interrupting the driving force, and with an automated transmission shifts are carried out with interruption of the driving force. In the drivetrain of FIG. 1 a further clutch 7 is interposed between the electric motor 3 of the hybrid drive and the transmission 5. This clutch 7 serves as the transmission-external starting element when starting under electric motor power.

Figure 2:
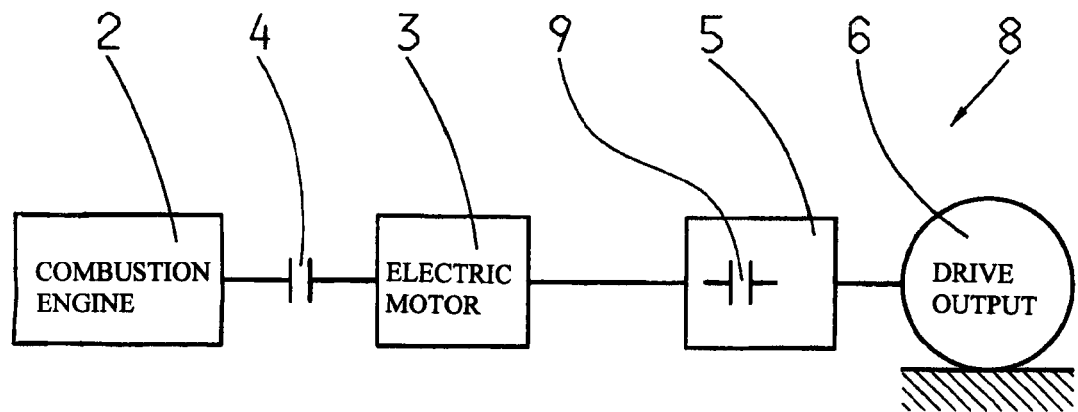
FIG. 2: An alternative layout of a motor vehicle drivetrain with which the method according to the invention can be used.

FIG. 2 shows an example of another layout of a motor vehicle drivetrain with which the method according to the invention can be used, the drivetrain 8 of the drivetrain layout according to FIG. 2 differing from the drivetrain 1 of the drivetrain layout in FIG. 1 in that the clutch 7 or transmission-external starting element is omitted and replaced by a transmission-internal starting element 9.

Associated with the transmission 5 of the drivetrain 1 in FIG. 1 and the transmission 5 of the drivetrain 8 in FIG. 2 are in each case a main hydraulic pump (not shown) and an auxiliary hydraulic pump (also not shown), which serve to provide necessary hydraulic pressure in the respective transmissions 5 of the two drivetrains.

In the drivetrains 1, 8 of FIGS. 1 and 2 the auxiliary hydraulic pump serves to produce the hydraulic pressure required to start up the drivetrain, and in what follows starting strategies according to the invention for electric motor starting, using the electric motor 3 of the respective drivetrain 1 or 8, will be described in detail.

With regard to a first aspect of the present invention, when the combustion engine 2 and the electric motor 3 are at rest and the clutch 4 interposed between the combustion engine 2 and the electric motor 3, and the starting elements 7 or 9, are disengaged, the procedure adopted for an electric motor start is that with the accelerator pedal actuated the auxiliary hydraulic pump is initially operated at a first power level. At this first power level the auxiliary hydraulic pump provides a pressure in the transmission 5 which is sufficient to hold a defined gear in the transmission 5. The defined gear may be, for example, the first forward gear or any other starting gear.

In the condition in which, with the brake pedal actuated, the auxiliary hydraulic pump is operated at the first power level, the electric motor 3 of the hybrid drive is preferably operated at a speed sufficient to provide a creep torque for the gear held in the transmission, although due to the actuation of the brake pedal this creep torque is not transmitted to the drive output 6 of the respective drivetrain.

Then, when the auxiliary hydraulic pump is being operated at the first power level with the accelerator pedal actuated so that a wish to start off with a desired starting power or a desired starting torque is recognized, the auxiliary hydraulic pump is changed from the first power level to a second power level.

At the second power level the auxiliary hydraulic pump supplies the transmission with a pressure required for providing or producing a starting torque. However, only after the lapse of a defined time interval after changing or switching the auxiliary hydraulic pump from the first to the second power level, is the speed of the electric motor 3 of the hybrid drive increased in order to produce the desired starting power or the desired starting torque.

Accordingly, only when the desired pressure increase in the transmission has taken place by switching the auxiliary hydraulic pump from the first to the second power level, is the speed of the electric motor increased in order to produce the desired starting power or the desired starting torque.

According to a first further development of this first aspect of the present invention, the auxiliary hydraulic pump is changed from the first to the second power level immediately after the brake pedal has been released.

In an alternative further development of the first aspect of the present invention, the auxiliary hydraulic pump is changed from the first to the second power level when, after the brake pedal has been released, a defined torque is detected in the drivetrain, for which purpose a drive torque at the drive output 6, a transmission output torque of the transmission 5 and/or a transmission input torque of the transmission 5 of the drivetrain concerned can be monitored.

This torque-dependent control or switching of the auxiliary hydraulic pump to change it from the first to the second power level is preferred.

With regard to a second aspect of the present invention, when the combustion engine 2 and the electric motor 3 are at rest and the clutch 4, interposed between the combustion engine 2 and the electric motor 3, and the starting element 7 or 9 of the respective drivetrain are disengaged, the procedure for electric motor starting of the drivetrain is that with the brake pedal actuated, the auxiliary hydraulic pump initially remains switched off.

Only after a desire to start has been recognized is the auxiliary hydraulic pump changed to a power level such that it supplies the transmission 5 on the one hand with a pressure required for engaging a defined gear, and on the other hand a pressure required in order to produce a starting torque. According to the second aspect of the present invention this power level preferably corresponds to the second power level of the first aspect of the invention, described above.

Only after the lapse of a defined time interval after changing the auxiliary hydraulic pump to the power level, is the speed of the electric motor 3 of the hybrid drive increased in order to produce the desired starting power or the desired starting torque.

According to the second aspect of the present invention, the auxiliary hydraulic pump can be changed to the power level, again, either directly after the release of the brake pedal or, with the brake pedal released, after the detection of a defined torque in the drivetrain. For this purpose, again, a drive torque, a transmission output torque and/or a transmission input torque can be monitored.

INDEXES

1 Drivetrain
2 Combustion engine
3 Electric motor
4 Clutch
5 Transmission
6 Drive output
7 Clutch/transmission-external starting element
8 Drivetrain
9 Transmission-internal starting element

The invention claimed is:

1. A method of operating a motor vehicle drivetrain, the drivetrain comprising at least a hybrid drive with an internal combustion engine and an electric motor, a clutch being interposed between the combustion engine and the electric motor, a transmission being arranged between the hybrid drive and a drive output, with which a main hydraulic pump and an auxiliary hydraulic pump are associated, and a transmission-internal or a transmission-external starting element, the method comprising the steps of:

initiating, an electric motor start of the motor vehicle, when the combustion engine is at rest, the clutch, interposed between the combustion engine and the electric motor, and the starting element are disengaged, and a brake pedal actuated;

operating the auxiliary hydraulic pump, at a first power level, to supply the transmission with a pressure required for retaining a desired gear and operating the electric motor at a speed to provide a creep torque through the desired gear;

recognizing a desire to start;

changing the auxiliary hydraulic pump from the first power level to a second power level to supply another pressure to the transmission required for transmitting either a starting power or a starting torque through the desired gear;

increasing the speed of the electric motor, only after a lapse of a defined time interval which starts upon completion of changing the auxiliary hydraulic pump from the first to the second power level, the increased speed of the electric motor producing either the desired starting power or the desired starting torque.

2. The method according to claim 1, further comprising the step of changing the auxiliary hydraulic pump from the first power level to the second power level immediately after the brake pedal has been released.

3. The method according to claim 1, further comprising the step of the changing the auxiliary hydraulic pump from the first power level to the second power level after the brake pedal is released, following detection of a defined torque in the drivetrain.

4. The method according to claim 3, further comprising the step of monitoring at least one of a drive torque, a transmission output torque and a transmission input torque for detecting the defined torque in the drivetrain.

5. A method for operating a motor vehicle drivetrain, the drivetrain comprising at least a hybrid drive with an internal combustion engine and an electric motor, a clutch being interposed between the combustion engine and the electric motor, a transmission being arranged between the hybrid drive and a drive output, with which a main hydraulic pump and an auxiliary hydraulic pump are associated, and a transmission-internal or a transmission-external starting element, the method comprising the steps of:

initiating, an electric motor start of the motor vehicle, when the combustion engine is at rest, the clutch, interposed between the combustion engine and the electric motor, and the starting element are disengaged, and a brake pedal actuated;

initially retaining the auxiliary hydraulic pump in a switched off state;

recognizing a desire to start;

changing the auxiliary hydraulic pump to a power level, the auxiliary hydraulic pump at the power level supplies the transmission with a pressure required for engagement of a defined gear and transmission of a starting torque through the desired gear;

increasing a speed of the electric motor, only after a lapse of a defined time interval which starts after the auxiliary hydraulic pump has been changed to the power level to supply the transmission with the pressure required for the engagement of the defined gear, the increase of speed of the electric motor producing either a desired starting power or a desired starting torque which is transmitted through the desired gear.

6. The method according to claim 5, further comprising the step of changing the auxiliary hydraulic pump to the power level immediately after the brake pedal is released.

7. The method according to claim 5, further comprising the step of changing the auxiliary hydraulic pump to another power level after the brake pedal is released, following detection of a defined torque in the drivetrain.

8. The method according to claim 7, further comprising the step of monitoring at least one of a drive torque, a transmission output torque and a transmission input torque for detecting the defined torque in the drivetrain.

* * * * *